United States Patent
Monaci et al.

(10) Patent No.: US 9,655,207 B2
(45) Date of Patent: May 16, 2017

(54) SENSOR NETWORK WITH ADAPTIVE DETECTION SETTINGS BASED ON THE STATUS INFORMATION FROM NEIGHBORING LUMINAIRES AND/OR CONNECTED DEVICES

(71) Applicant: PHILIPS LIGHTING HOLDING B.V., Eindhoven (NL)

(72) Inventors: Gianluca Monaci, Eindhoven (NL); Remco Theodorus Johannes Muijs, Meteren (NL); Harry Broers, 'S-Hertogenbosch (NL); Petrus Johannes Arnoldus Hubertus Kuyten, Deurne (NL); Daniel Martin Goergen, Eindhoven (NL); Tim Corneel Wilhelmus Schenk, Eindhoven (NL); Muhammad Shoaib, Enschede (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/910,636

(22) PCT Filed: Aug. 22, 2014

(86) PCT No.: PCT/IB2014/064020
§ 371 (c)(1),
(2) Date: Feb. 5, 2016

(87) PCT Pub. No.: WO2015/028921
PCT Pub. Date: Mar. 5, 2015

(65) Prior Publication Data
US 2016/0198548 A1    Jul. 7, 2016

Related U.S. Application Data

(60) Provisional application No. 61/870,593, filed on Aug. 27, 2013, provisional application No. 61/904,095, filed on Nov. 14, 2013.

(51) Int. Cl.
*B60R 25/10* (2013.01)
*H05B 37/02* (2006.01)

(52) U.S. Cl.
CPC ..... *H05B 37/0227* (2013.01); *H05B 37/0218* (2013.01); *Y02B 20/46* (2013.01)

(58) Field of Classification Search
CPC ... B60R 25/24; B60R 25/102; B60R 25/2009; B60R 2325/306; G07C 9/00309
(Continued)

(56) References Cited

U.S. PATENT DOCUMENTS

| 4,636,774 A | 1/1987 | Galvin et al. | |
| 2008/0094005 A1* | 4/2008 | Rabiner | H05B 33/0842 315/294 |

(Continued)

FOREIGN PATENT DOCUMENTS

| WO | 2010116283 A2 | 10/2010 |
| WO | 2010125483 A2 | 11/2010 |

(Continued)

*Primary Examiner* — Minh D A

(57) ABSTRACT

The invention provides a light control system for a lighting network, including a plurality of light units wherein at least one light unit includes at least one sensor type, a distributed/centralized controller/central management system in communication with one or more of the light units, said controller/central management system sends control commands to one or more of said light units, in response to received light unit status/sensor information from one or more of said light units and/or status information from a connected device, and implements a lighting strategy relating to the characteristics of the plurality of light units, wherein the one or more neighboring light units' sensor type's detection threshold are adjusted using a predetermined strategy based on the new lighting strategy of the at least one light unit or the status information from the connected device.

6 Claims, 3 Drawing Sheets

(58) Field of Classification Search
USPC .............. 315/34, 197, 312, 308, 297, 293; 340/426.13, 426.14, 426.15, 426.16, 340/426.17
See application file for complete search history.

(56) References Cited

U.S. PATENT DOCUMENTS

| | | | |
|---|---|---|---|
| 2008/0122376 A1* | 5/2008 | Lys | H05B 33/0857 315/192 |
| 2010/0301774 A1* | 12/2010 | Chemel | H05B 37/029 315/297 |
| 2012/0206050 A1* | 8/2012 | Spero | B60Q 1/04 315/152 |
| 2012/0280625 A1 | 11/2012 | Zampini, II et al. | |
| 2012/0286673 A1 | 11/2012 | Holland et al. | |
| 2013/0026928 A1 | 1/2013 | Bizzotto et al. | |

FOREIGN PATENT DOCUMENTS

| | | |
|---|---|---|
| WO | 2011098931 A1 | 8/2011 |
| WO | 2011154906 A1 | 12/2011 |
| WO | 2012064906 A2 | 5/2012 |
| WO | 2013067389 A1 | 5/2013 |

* cited by examiner

SENSOR NETWORK WITH ADAPTIVE DETECTION SETTINGS BASED ON THE STATUS INFORMATION FROM NEIGHBORING LUMINAIRES AND/OR CONNECTED DEVICES

CROSS-REFERENCE TO PRIOR APPLICATIONS

This application is the U.S. National Phase application under 35 U.S.C. §371 of International Application No. PCT/IB2014/064020, filed on Aug. 22, 2014, which claims the benefit of U.S. Provisional Application No. 61/870,593, filed on Aug. 27, 2013 and U.S. Provisional Application No. 61/904,095, filed on Nov. 14, 2013. These applications are hereby incorporated by reference herein.

The present invention is directed generally to lighting control of lighting networks with sensing and communication capabilities. More particularly, various inventive methods and apparatus disclosed herein relate to control of a lighting/sensing network for integrating illumination that can adapt the sensor's settings depending on the status information of the neighboring luminaires in the network or other connected devices, thereby increasing detection robustness, e.g. decreasing the number of false detections and missed detections, as well as methods for using the foregoing. The lighting network includes an array of light units, and a network apparatus, hardware, and software for monitoring and managing the array, and/or analyzing sensor information gathered from the array for targeted lighting control.

Lighting systems are becoming increasingly sophisticated to respond to a growing demand of efficiency and simplicity. In recent years Koninklijke Philips NV (herein after "Philips") has been developing products and concepts of smart and efficient lighting systems to address these needs. Philips Starsense, for example, is a telemanagement solution to connect, control and diagnose lighting installations, down to the individual light point. Another recent innovation by Philips is the LumiMotion sensor, which includes a camera and a processing unit to detect the presence of a person close to the light source and turn on the luminaire to which it is connected, which is normally dimmed. The combination of sensing and communication capabilities makes a lighting system a smart sensor network that can be exploited to improve the overall system performance.

Despite the progress made in recent years to improve sensors' detection accuracy, there is room to improve sensors' performances in complex, real-world operating conditions. One of the fundamental factors influencing detectors' performances is the accuracy of the settings of the detection algorithms, in order to minimize missed detections and false detections (events that erroneously trigger detection but are not "valid" objects, such as small animals or moving branches). Typically, algorithmic settings have to be adapted to the sensor, application, conditions and location at hand to maximize performance. This however can have detrimental consequences on the flexibility of the detection system: it is typically a delicate and difficult task to achieve a good compromise between accuracy and flexibility.

The Philips LumiMotion system, for example, is a vision system operating at very low light levels. Detection performances of camera-based detection systems as LumiMotion strongly depend on the light level at which the system operates. Namely, detection is more difficult in low light conditions, because objects to be detected are in the same range of noise. In this condition, detection systems are typically prone to false detections, if the system is very sensitive, or to missed detections if the system is very selective. Similarly, passive infrared (PIR) presence detectors can produce numerous false detections, especially when placed outdoor, because of moving branches that are erroneously detected as persons. Thus, there is a need in the art for a system and method to reduce or overcome these limitations.

According to the principles of the present invention and to overcome or improve the above limitations, we adapt the detection parameters to the ambient light level or an indication of a flux in relation to a light unit, e.g. the expected flux of objects to be detected using, for example the operational status of neighboring connected devices, e.g., traffic lights, vehicle lights, or other "connected" means, thereby increasing/decreasing detection robustness. In one example, if a neighboring light is on, the detector can be more selective, if it is off, the detector should be more sensitive. In a second example, the flux heading to the detector is estimated using status information of connected devices, for example, neighboring traffic lights regulating the traffic towards the detector. The estimated flux is then used to increase/decrease the sensitively of neighboring light units.

The term "neighboring" connected devices or "neighboring" light units as used herein means that the light units or connected devices that are in close proximity to each other as to effect the lighting characteristics of each other or within the operational use of other light units. For example, where one light unit's illumination pattern affects another's light unit's illumination pattern or sensing area. Or in the case of a connected device, the operation of the connected device is within or near the illumination pattern of a light unit or within the operational use of the light unit (e.g. factoring user traveling rates, etc.).

The present disclosure is directed to inventive methods and apparatus for the control of lighting networks. The invention is a system comprising a lighting network (LN) including an array of light units or luminaires, sensors and/or other integrated or connected devices (hereinafter referred to as "light units"), a central management system (CMS) or controller, a wired/wireless network, including software, firmware, for monitoring and managing the LN, as well as information management via the LN. The LN comprises multiple light units that may operate mainly in an independent mode where dimming, sensing, communication, and control processes take place between the various light units. Further communication and control may be provided between the light units and a CMS.

The central management system (CMS) is operable to: receive and process light unit information, in particular, sensor unit data or connected device information, determine a lighting strategy (e.g. dimming/illumination requirements), and in particular, dynamically adapting the detection threshold settings of a respective light unit's sensor based on neighboring light units illumination status or connected device information; determine/update the lighting strategy; coordinate the operation of the identified lighting units as a function of the lighting strategy, and send operation instructions to one more of light units s to direct the identified light units to operate in accordance with the operation.

Another aspect of the invention provides a light unit in the LN connected to a CMS, the light unit includes a processor; a memory operably connected to the processor; a sensing unit, and a communication module operably connected to the processor for communication with the CMS and other light units. The sensor can be any sensor for sensing any environmental condition. The processor is operable to:

receive sensing data and determine various conditions including lighting conditions, user/vehicle detection status, etc. with or without the CMS; transmit the sensor data through the communication module to the CMS; receive an operation instruction for operation of the light unit through the communication module from the CMS; and direct the light unit to operate in accordance with the operation instruction.

One object of the invention is to to control the lighting network's reaction to sensor stimuli such that its behaviour meets certain desired lighting strategy or characteristics (user perspective), e.g. it is undesirable for lamps in a residential area to turn off and back on again many times during the evening and night. This is achieved by increasing detection robustness, e.g. decreasing the number of false detections and missed detections.

One embodiment of the invention provides a light management system for a lighting network system having a plurality of light units each including at least one sensor type, where each of the light units communicates with at least one other light unit, a central management system or controller in communication with (some or all of) the light units, said central management system sends control commands to one or more of said light units. In addition a user input/output device may be in communication with one or more of said light units. The sensitivity or detection threshold of the sensor type can be varied in dependence on the status of one or more neighboring light units or other connected devices as further described below. For example, decreasing the sensitivity of an (image) sensor if a nearby lamp of a light unit is illuminated, in the expectation that stronger shadows will be cast and images will have more contrast, which will be more easily identifiable in the captured image data. Similarly, if a neighboring connected device such as a traffic light is red, the probability of detecting a car is low and detection settings are set in such a way that the detector becomes more selective, and false detections are reduced. Conversely, if the traffic light is green, the probability of detecting a car is high and detection settings are set in such a way that the detector is more sensitive, and missed detections are reduced. In these ways the detector becomes more selective and false detections are reduced, while true detections are preserved due to the higher image contrast.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques, and methods are omitted so as not to obscure the description of the present system. It should be expressly understood that the drawings are included for illustrative purposes and do not represent the scope of the present system. In the accompanying drawings, like reference numbers in different drawings may designate similar elements. Also, the drawing figures are not necessarily to scale, emphasis instead generally being placed upon illustrating the principles of the invention.

Embodiments of the present system may interface with conventional lighting infrastructures such as urban walkway, street, and/or highway lighting systems to control one or more portions of conventional lighting systems. It should also be understood that the sensors of the sensing unit can be any sensor for sensing any environmental condition, ranging from any electromagnetic signals to acoustic signals to biological or chemical signals to other signals. Examples include an IR detector, a camera, a motion detector, an ozone detector, a carbon monoxide detector, other chemical detectors, a proximity detector, a photovoltaic sensor, a photoconductive sensor, a photodiode, a phototransistor, a photo emissive sensor, a photo electromagnetic sensor, a microwave receiver, a UV sensor, a magnetic sensor, a magneto resistive sensor, and a position sensor.

Figure 1:
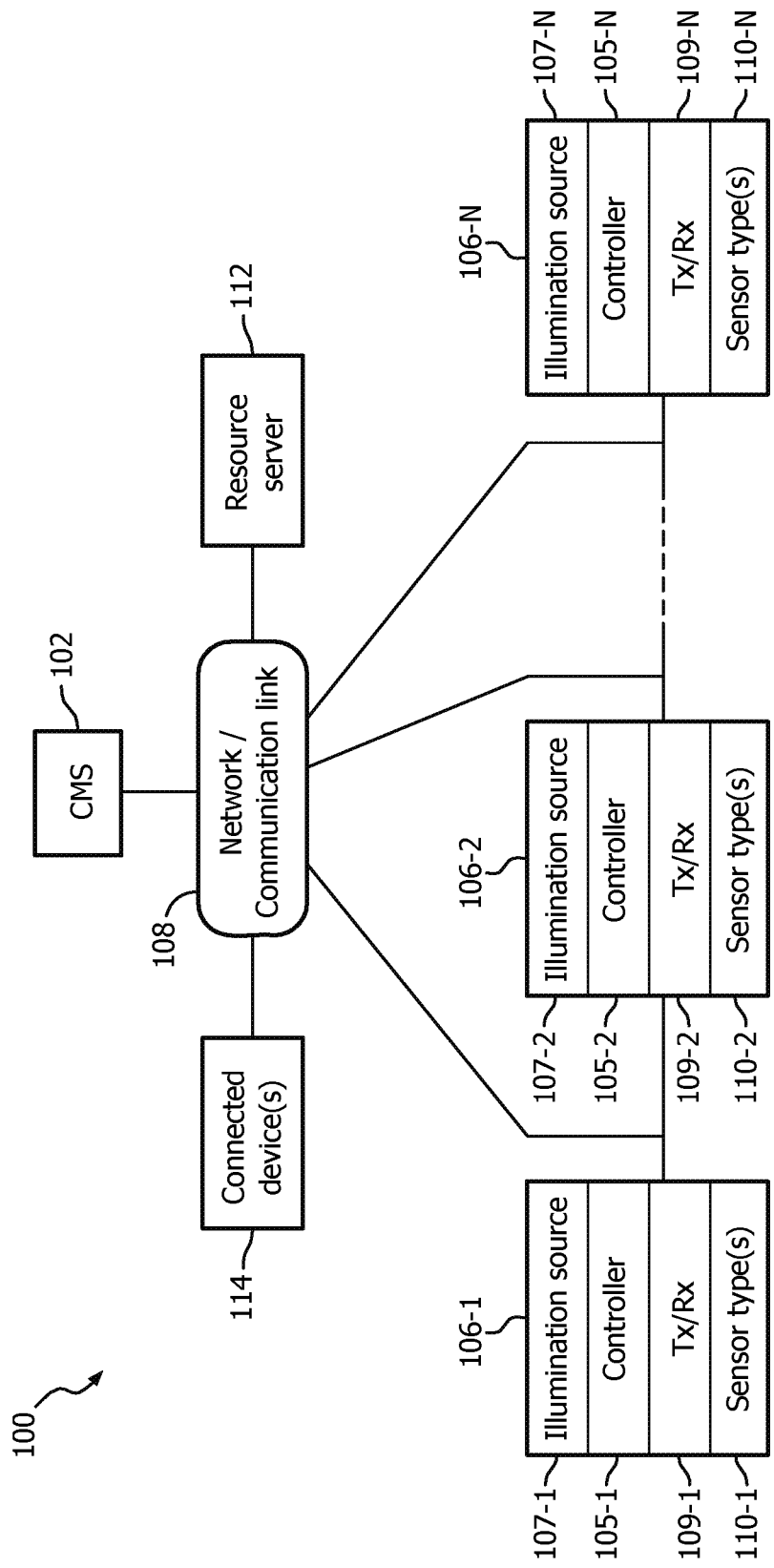
FIG. 1 is a schematic view of an lighting network (LN) in accordance with embodiments of the present system.

FIG. 1 is a schematic view of a lighting network (LN) 100, a controller or central management system (CMS) 102 and an information resources server 112 (e.g. weather, traffic, public safety/security reports or other, for example news media or Internet available information), in accordance with embodiments of the present system. Although FIG. 1 shows the elements of the lighting network (LN) 100 as discrete elements, it is noted that two or more of the elements may be integrated into one or device. The lighting network (LN) 100 includes a plurality of intelligent light units or luminaires (and/or electrical devices) 106-1 through 106-N (generally 106), a plurality of illumination sources 107-1 through 107-N, a plurality of controllers 105-1 through 105-N, a plurality of transmission/receive (TX/Rx) units 109-1 through 109-N, a plurality of sensors 110-1 through 110-N, connected devices 114 and a network/communication link 108 which, in accordance with embodiments of the present system, may operably couple two or more of the elements of the present system.

When LN 100 is installed, the GPS coordinate information of each element (e.g. light units 106, connected devices 114 (light poles, sensors 110, traffic lights, etc.) in the system is generally recorded, and is available to CMS 102. All the elements are typically further placed onto a map, therefore it is known to the CMS 102; for example, which traffic light regulates the traffic leading to certain light units 106. This information can be included manually at commissioning or can be deduced using the relative GPS coordinates and the geographical map with tagged streets and traffic flows, available e.g. on OpenStreetMap. Associations between light units 106 can then be stored in the memory of the CMS 102.

The connected device 114 can be any element in a smart city connected infrastructure that can provide information to help the light units 106 tune its detection behavior to improve robustness. The connected device is any device that includes an interface apparatus to communicate with the LN 100 via network 108. Any desired technology, such as a cellular data communication protocol (e.g., GSM, CDMA, GPRS, EDGE, 3G, LTE, WiMAX,), DSRC or WiFi radio, ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like, can be used.

The connected devices 114 may include the following:

Connected pedestrian or bicycle traffic lights to distinguish traffic types to enable the system to behave differently depending on the traffic type; variable connected traffic signs to allow dynamically steering traffic flows, open/close lanes as needed, direct drivers in parking areas etc.; connected surveillance cameras to enable increasing/decreasing the detection threshold of neighboring light units 106 based on if someone is expected to pass by; connected traffic management systems to enable increasing/decreasing the detection threshold of neighboring light units 106 based if a vehicle is expected to pass; connected (interactive) kiosks and advertising to enable increasing/decreasing the detection threshold of neighboring light units 106 based if someone is using a kiosk or is detected in front of an interactive advertising system connected to the same infrastructure; connected urban furniture to enable increasing/decreasing the detection threshold of neighboring light units 106 based on sensors connected to furniture that assess presence and/or usage, such as trash bins, benches, bike racks, bus shelters, children playgrounds, etc.

The CMS 102 may include one or more processors which may control the overall operation of the lighting network (LN) 100. The CMS 102 may also be "distributed" (e.g. de-centralized in-network processing or hierarchical system, for example, the StarSense system where each segment controller controls a sub-set of light poles). Moreover, the processing may be distributed between the CMS 102 and one or more controllers 105, described further below. The CMS 102 may also access to other information about the system and the environment, such as date/time of the day, historic detection data, condition of the infrastructure etc., for example, received via Resource Server 112. Moreover, the CMS 102 may request information from the resources server 112 and may determine when to charge selected light strategies for light units 106 in accordance with system settings based on received information and/or history information (e.g., traffic light status, security data, pedestrian data or other so-called "connected" data means available from the Internet, for example). The system may include statistical and/or heuristic engines to fit data. LN 100 can use a city management dashboard application such as the Philips CityTouch. Accordingly, the CMS 102 may communicate with, the light units 106, the sensors 110, to send and/or receive (via Tx/Rx units 109) various information in accordance with embodiments of the present system.

Illustratively, the CMS 102 receives sensor information from one or more of the sensors 110 and for example to change the sensitivity or detection threshold of the sensor type 110 of a light unit 106, for example, based on the illumination status or other change in lighting status (e.g. traffic light 106-2 change) of a neighboring light unit 106. For example, when the central management system 102 receives a ("true") sensor detection from a first light unit's 106 sensor type 110 (e.g. light unit 106-1), a first control command is sent to the first light unit 106-1 to change its lighting strategy (e.g. turn "on" the illumination source 107-1 or increase (or decrease) the illumination level or traffic light change from red to green) and a second control command to one or more light units (e.g. light unit 106-2) neighboring the first light unit that the first light unit's lighting strategy has changed (e.g. turned "on"), and wherein the one or more neighboring light units 106-2 adjust their sensor type's 110-2 detection threshold using a predetermined strategy based on the new lighting strategy of the first light unit 106-1. The predetermined (detection threshold) strategy may include: 1) to decrease the sensitivity when a neighboring light unit is turned "on" or the light level is increased, 2) to increase the sensitivity when a neighboring light unit is turned "off" or the light level is decreased, 3) increase or decrease the sensitivity in proportion to the illumination level of the neighboring light unit, 4) increase or decrease the sensitivity based on an indication of the expected flux of objects to be detected from connected device 114, for example the operational status of a traffic light.

In one embodiment, the relationship between light output and sensor sensitivity may be linear, wherein the light photons out of a neighboring light unit 106 doubles, this results in two times more light photons in the sensor type 110 (e.g. camera), therefore the detection threshold is reduced by one half. In general, the sensor type's sensitivity may be adjusted inversely proportional to the level of increase or decrease of the light level. Thus, for each fractional increase/decrease (e.g. dimming level of the light source) in light level there is a corresponding inversely proportional increase/decrease in the sensor type's sensitivity. However, it is noted that in practice many factors influence this mechanism. First, there is not only one detection criterion (one detection threshold), but several criteria whose effects are tightly entangled. Moreover, the manner in which light travels from a source to a sensor depends on the environment: relative positions, light source characteristics such as its directionality, sensor characteristics such as viewing angle, type and material of objects in the scene, presence of obstacles etc. Various algorithms can be used with lighting network (LN) 100 to address these factors to provide an accurate model of a particular environment.

The sensitivity may be increased or decreased not only for an entire sensor type 110, but for only portions of the sensor type's 110 area or region of sensor range (e.g., the zone of detection of the sensor type 110, based on its commissioning or installation). For example, when the sensor type 110 is a camera sensor, the sensitivity may be selectively increased/decreased only for selected areas or regions in the imaging area of the camera that are influenced by the neighboring light units 106 that is being turned "off" or "on". Various algorithms can be used with lighting network (LN) 100 to determine which neighboring light units 106 are influencing which part of the image captured by the camera sensor.

In another embodiment, status information regarding connected device 114, for example a traffic light regulating the (vehicle, pedestrian or bicycle) traffic heading towards neighboring light units 106 is provided to CMS 102 or controller 105 (e.g. red, yellow or green status). This information is used to forecast the level of traffic the neighboring light units 106 can expect, or the expected flux of objects to be detected. The CMS 102 determines which light unit 106 the traffic is leading too and decides which detection threshold level should be used by the relevant light unit 106. The decision can simply consist in selecting a certain threshold among a number of predetermined preset values. To make sure that detections are not missed, CMS 102 or controller 105 decreases the detection threshold of the neighboring light units 106. In contrast, if for example a traffic light is red, the CMS 102 or controller 105 increases the threshold of neighboring light unit 106 to decrease the chance of false detections, since very low traffic is expected. As described herein, the CMS 102 or controller 105 can use also other information to decide to which level to set the detection threshold of the neighboring light units 106 from resource server 112, using for example knowledge about date and time of the day and historic data: detection thresholds can be set to higher values if little traffic is expected, e.g. between 2 am and 5 am, to minimize the risk of false detections, or can be set to lower values to avoid missed detection when more traffic is expected based on historic evidence.

As noted each light unit 106 can communicate with other light units 106. Thus, if light unit 106-3 receives a signal from the connected device 114 (traffic light) that its status is "green", light unit 106-4 can determine that an increased number of vehicles are heading towards it and can thus: i) lower its own detection threshold and ii) communicate this information to light unit 106-4, that can then decide to lower its detection threshold as well. Each light unit 106 can be connected to several light units 106 (the communication can extend to more than one hop). Several strategies can be used to adjust the detection threshold, for example by accumulating evidence from multiple light units 106 or for a longer period of time.

The memory in the LN and CMS may include any suitable non-transitory memory and is used to store information used by the system such as information related to operating code, applications, settings, history, user information, account information, weather related information, system configuration information, calculations based thereon, etc. The memory may include one or more memories which may be located locally or remote from each other (e.g., a surface area network (SAN).

As noted above, the CMS 102 stores information in the memory (e.g., historical information) which it receives and/or generates for further use such as to determine lighting characteristics and sensor detection thresholds in accordance with embodiments of the present system. As new information is received by the CMS 102, the stored information may then be updated by the CMS 102. The CMS 102 may include a plurality of processors which may be located locally or remotely from each other and may communicate with each other via the network 108.

The network 108 may include one or more networks and may enable communication between one or more of the CMS 102, the light units 106, the sensors 110, using any suitable transmission scheme such as a wired and/or wireless communication schemes. Accordingly, the network 108 may include one or more networks such as a wide area network (WAN), a local area network (LAN), a telephony network, (e.g., 3G, a 4G, etc., code division multiple access (CDMA), global system for mobile (GSM) network, a plain old telephone service (POTs) network), a peer-to-peer (P2P) network, a wireless fidelity (WiFi™) network, a Bluetooth™ network, a proprietary network, the Internet, etc.

The Resource server 112, which may include other related information resources such as proprietary and/or third party news media and Internet related resources which may provide information such as public safety, security, regulatory, traffic, weather, road condition reports and/or forecasts to the CMS 102 and/or the light units 106. This information may be used to further refine a detection threshold in conjunction with the illumination status of the various light units 106.

The sensors 110 may include a plurality of sensors types such as sensors 110 which may generate sensor information based on the particular sensor type such as image information, status information (e.g., light unit operative, non-operative, etc.), radar information (e.g., Doppler information, etc.), geophysical information (e.g., geophysical coordinates obtained from, for example, a global positioning system (GPS)), pressure information, humidity information, etc. The sensors 110 may be located at one or more geophysical locations or integrated into a light unit 106, and may report their location to the CMS 102. Each sensor 110 may include a network address or other address which may be utilized to identify the sensor.

The light units 106 may include one or more illumination sources 107 such as lamps (e.g., a gas lamp, etc.), light emitting diodes (LEDs), incandescent lamps, fluorescent lamps, etc., and may be controlled by the controller 105. The illumination sources may be configured in a matrix (e.g., a 10×10 matrix of illumination sources) in which illumination characteristics such as illumination pattern, intensity, spectrum (e.g., hue, color, etc.), polarization, frequency, etc., from one or more of the plurality of illumination sources and/or light pattern for a plurality of illumination sources, may be actively controlled by the system.

The light units 106 are further operable to receive control signals from the CMS or controller 105 to vary the sensitivity or detection threshold of sensors 107 in dependence on operational status of neighboring light units 106 or their illumination sources 107.

In one embodiment, when the controller 105-1 receives a ("true") sensor detection from its corresponding sensor type 110-1 (e.g. light unit 106-1), a control command is sent to the illumination source 107-1 to change its lighting strategy (e.g. turn "on" the illumination source 107-1 or increase (or decrease) the illumination level) and another control command to one or more light units (e.g. light unit 106-2) neighboring the light unit 106-1 that it's lighting strategy has changed (e.g. turned "on"), and wherein the one or more neighboring light units 106-2 adjust their sensor type's 110-2 detection threshold using a predetermined strategy based on the new lighting strategy of the light unit 106-1. The predetermined (detection threshold) strategy may include: 1) to decrease the sensitivity when a neighboring light unit is turned "on', 2) to increase the sensitivity when a neighboring light unit is turned "off", or 3) increase or decrease the sensitivity in proportion to the illumination level of the neighboring light unit.

Figure 2:
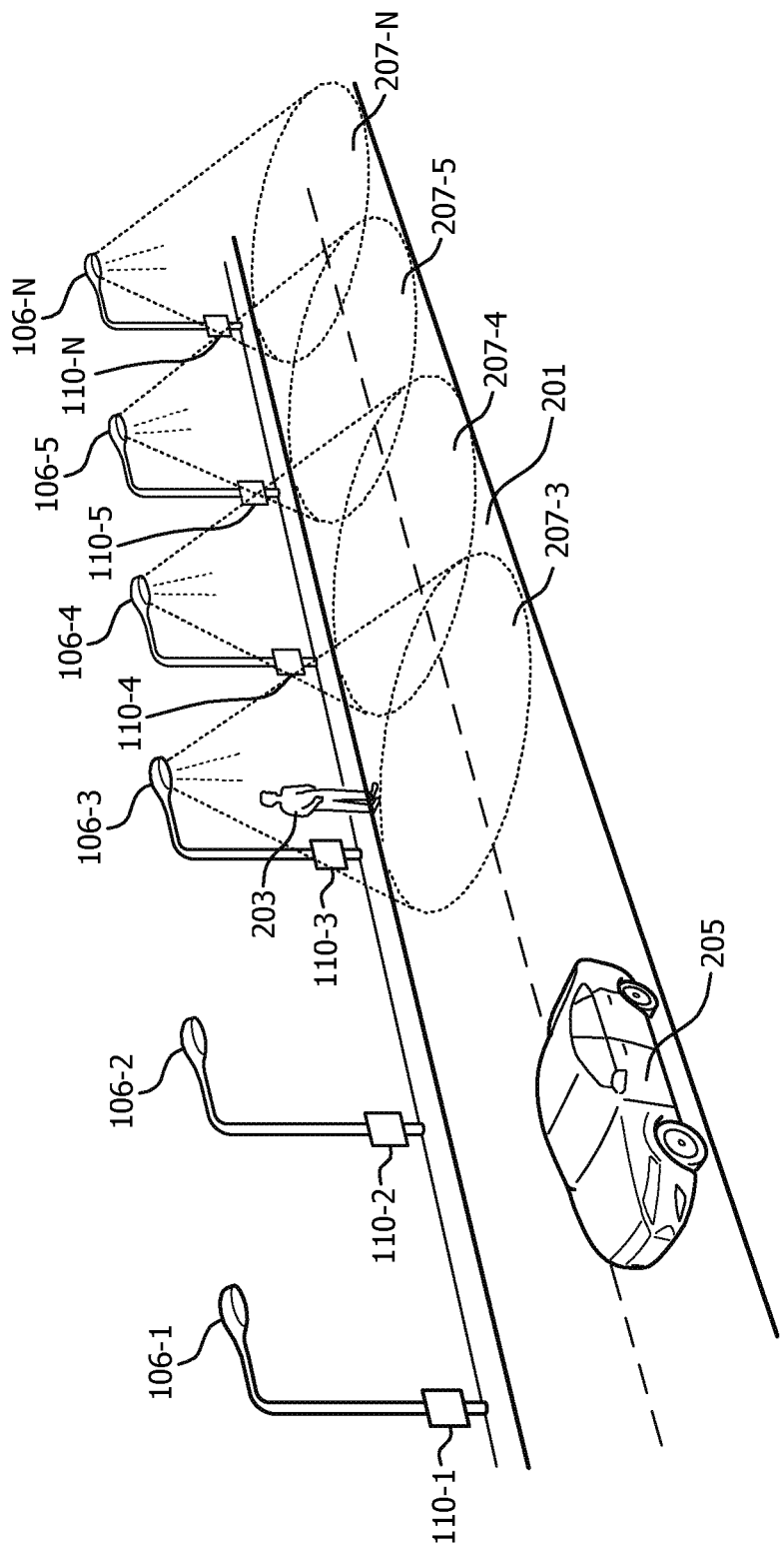
FIG. 2 is perspective view of a lighting system in accordance with embodiments of the present system.

FIG. 2 is perspective view of a lighting system 200 (a portion of outdoor lighting network (LN) 100) in accordance with embodiments of the present system). The lighting system 200 may be similar to the lighting network (LN) 100 and may include a plurality of light units 106-1 through 106-N which may illuminate a surface 201 such as a street, sidewalk, park, parking lot, etc. with a controllable illumination 207-3 through 207-N. One or more of the light units 106 may include one or more of an illumination source 107, a controller 105, a Tx/Rx unit 109 (not shown) and connected device 114, illustratively a traffic light.

Light units 106 detect the presence of user/pedestrians 203 or vehicles 205. This information can be used for monitoring purposes or to activate the illumination sources 107 of light units 106 that react to a user presence, as in the Philips LumiMotion system. Each light unit 106 creates a detection signal that combines aspects of the sensor output signals useful to perform detection, and that presence is assessed by comparing such detection signal to a detection threshold. Thus, detection performances depend only to the setting of the detection threshold, in this case: if the detection signal is higher than the detection threshold, presence is detected, otherwise not. It should be noted that this is an oversimplification, since presence detection algorithms are typically sophisticated processing algorithms that use a large number of signal qualities to assess presence.

In accordance with one aspect of the present invention, if the light units 106 are initially turned off, and if light unit's 106-3 sensor type 110-3 detects presence of a pedestrian 203, it switches its associated illumination source 107-3 on or to a predetermined illumination level determined by the lighting strategy. This information (that illumination source 107-3 is "on") is also communicated by CMS 102 or light unit's controller 105-3 to light unit 106-4. When illumination source 107-3 is illuminated, the CMS 102 or light unit's 106-4 controller 105-4 determines whether to change the lighting strategy (e.g. change the detection threshold sensitivity of other light units 106, dimming, etc.) of the next few neighboring light units 106, for example, in the direction of the traveling vehicle(s) or user(s) (while leaving other light units 106 unchanged). In particular, sensor type 110-4's and/or sensor type 110-2 sensitivity can be adjusted based on this information. For example, sensor type 110-2 & 4's detection threshold will be increased (by a control signal from the CMS, for example) to decrease the sensitivity (i.e. increase selectivity) of the detection algorithm, in the expectation that stronger shadows will be cast and images will have more contrast, which will be more easily identifiable in the captured image data. In this way false detections are reduced, while true detections are preserved thanks to the higher image contrast. From any change in illumination level (e.g. increase or decrease) of any light unit 106, a new lighting strategy is determined and sensor detection threshold levels are updated of respective neighboring light units 106.

In accordance with another aspect of the present invention, when connected device 114 operational status changes, in this case when the traffic light changes from red light to green light, a signal is communicated to CMS 102 or neighboring light unit's controller 105-3 of light unit 106-3. The CMS 102 or light unit's 106-3 controller 105-3 determines whether to change the lighting strategy (e.g. change the detection threshold sensitivity, dimming, etc.) or of the next few neighboring light units 106, for example, in the direction of the traveling vehicle(s) or user(s) (while leaving other light units 106 unchanged). CMS 102 or controller 105 estimates the flux heading to a particular light unit 106 using the status of neighboring traffic lights regulating the traffic towards the detector. The sensor type 110-3's and/or sensor type 110-4 sensitivity are adjusted based on this information. For example, sensor type 110-2 & 4's detection threshold will be increased (by a control signal from the CMS, for example) to decrease the sensitivity (i.e. increase selectivity) of the detection algorithm, in the expectation that more or less traffic will be forthcoming based on the direction of traffic and the status of the traffic light, e.g. red (stopped traffic) or green (moving traffic). The increase or decrease in sensitivity may, for example, be proportional to the estimated flux. In this way false detections are reduced, while true detections are preserved. From any status change in connected device 114, a new lighting strategy is determined and sensor detection threshold levels are updated of respective neighboring light units 106.

As noted above, the proposed invention can be applied also in sensor networks that are not controlled by a CMS 102. In this case, each sensor type 107 communicates with a number of neighboring units, e.g. those within a certain spatial range. Each sensor type 107 is thus connected to several sensor type 107s (the communication can extend to more than one hop).

Figure 3:
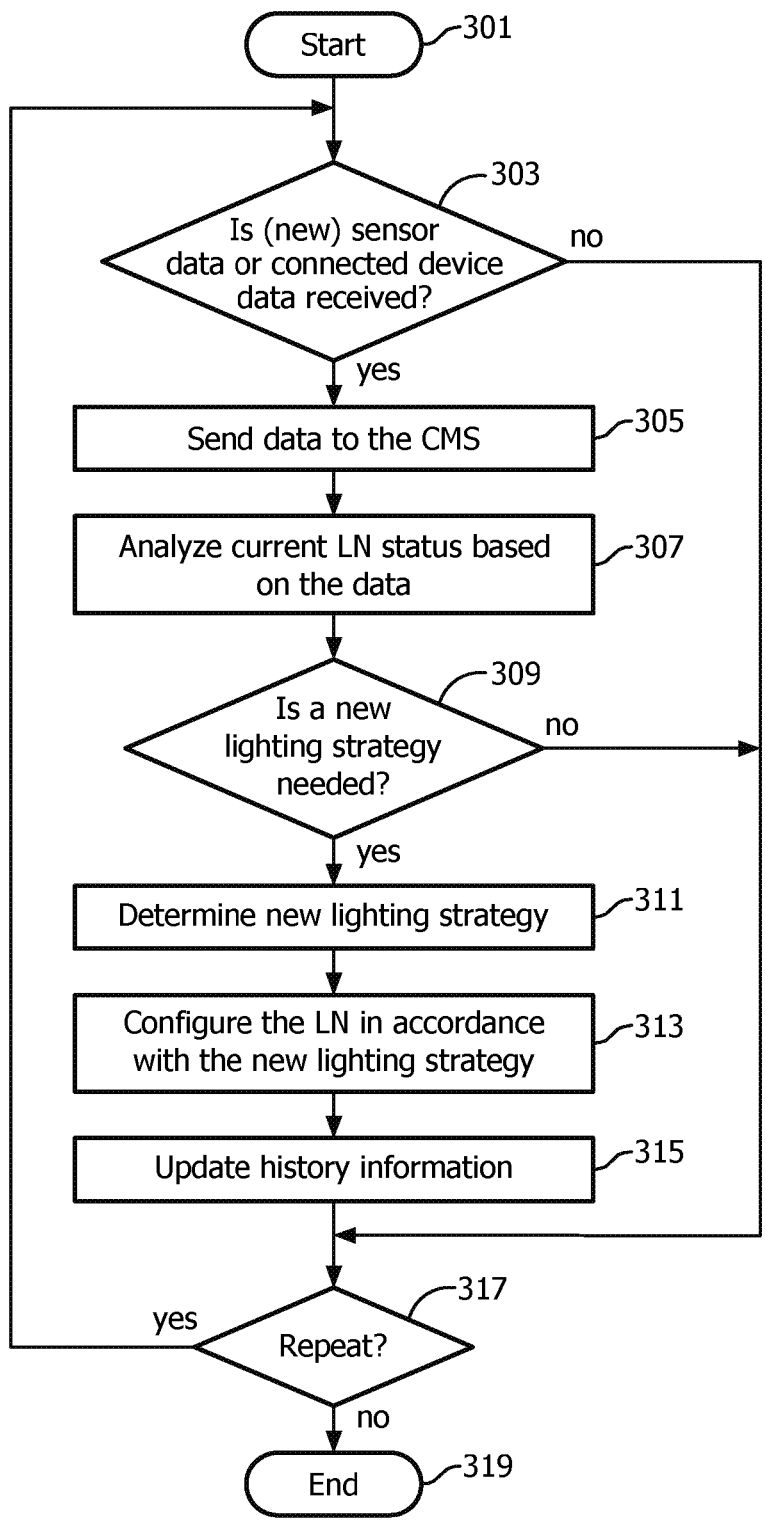
FIG. 3 shows a flow diagram that illustrates a process in accordance with embodiments of the present system.

FIG. 3 shows a flow diagram that illustrates a process 300 in accordance with embodiments of the present system. The process 300 may be performed by a system as shown in FIG. 1. The process 300 may include one of more of the following steps. Further, one or more of these steps may be combined and/or separated into sub-steps, if desired. In operation, the process may start during step 301 and then proceed to step 303.

During step 303, the process determines if one of the sensor types 107 detects new sensor data from a light unit 106—e.g. a detection of a vehicle/user, or if new connected device 114 data is received. If this determination is Yes, then the process proceeds to step 305.

During step 305 of the process, some or all of the data from sensors 226 from each light unit 206 and/or connected device 114, which may include information related to the status of conditions in the vicinity of one or more luminaires/connected devices in accordance with embodiments of the present system, is sent to CMS 102 (or one or more controllers 105). After obtaining the information, the process may continue to step 307.

During step 307, the process analyzes the current LN status. For example, the process may analyze if a detection in a respective light unit 105 is a "true" or "false" detection and whether a new lighting strategy is needed for a detected vehicle/user in accordance with embodiments of the present system. Additionally, the process may analyze and estimate the flux heading to a particular light unit 106 using the status of neighboring traffic lights regulating the traffic towards the detector.

In step 309, if a new lighting strategy is not needed, the process proceeds to step 317, If yes, the process proceeds to step 311, and a new lighting strategy is determine based on the sensor information from a light unit 106 with a "true" detection and in particular the sensor detection thresholds of neighboring light units 106 (of the light unit 106 with the "true" detection) are adjusted according the embodiments present invention. After completing step 311, the process continues to step 313, to configure the LN in accordance with the new lighting strategy.

During step 311, the present system may determine a lighting strategy in accordance with the embodiments of the present invention, such increase or decrease the detection thresholds of the sensor type 110 based on the an illumination level of a neighboring light unit 106 or status information from a connected device 114.

During step 315, the present system may form and/or update history information (e.g., statistical information) of a memory of the present system in accordance with the data, detection thresholds, number of "true" or "false" detections or other received information. For example, an indicator for behavior change, dimming schedule, original ambient level, and other parameters, e.g. road type, traffic volume, weather status, the sensor information, day, date, time, user travel patterns, etc. which information may be used at a later time. After completing step 315, the process may continue to step 317.

During step 317, the present system may determine whether to repeat one or more steps of the process. Accordingly, if it is determined to repeat one or more steps of the process, the process may continue to step 303 (or to another step which is desired to be repeated). Conversely, if it is determined not to repeat one or more steps of the process, the process may continue to step 319, where it ends. The process may be repeated at certain periodic and/or non-periodic time intervals. By repeating the process, history information may be accessed and used to determine, for example, rate of change of the sensor information. This information may be used to determine and/or tune appropriate responses in lighting system 200 to various situations and events.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A lighting control system comprising:
   at least one light unit 106 including at least one sensor 110; and
   a centralized or distributed controller 105 to control the at least one light unit's 106 lighting strategy;
   a connected device 114 in communication with the controller 105;
   wherein the controller 105 receives status information from the connected device 114, and determines an expected flux of objects directed toward the at least one light unit 106 prior to a detection from the at least one sensor 110, and adjusts the at least one light unit's 110 lighting strategy, including a detection threshold of the sensor 110, using the status information and/or determination of the expected flux.

2. The lighting control system of claim 1, wherein the controller 105 is a central management system (CMS) 102 or integrated in light unit 106.

3. The lighting control system of claim 1, wherein the controller 105 adjusts the at least one light unit's 110 lighting strategy by increasing or decreasing the detection threshold of the sensor 110.

4. The lighting control system of claim 1, wherein the sensor 110 is a camera and the detection threshold is adjusted only for a selected area or region in an imaging area of the camera in relation to the indication of expected flux of objects.

5. A method of light management for a lighting system, the lighting system having at least one light unit 106 having at least one sensor 110, a connected device 114 and a controller 105 to control the at least one light unit's 106 lighting strategy the method comprising the steps of:
   receiving, in the controller 105, status information from the connected device 114; includes an indication of
   determining an expected flux of objects directed toward the at least one light unit 106 prior to a detection from the at least one sensor 110; and
   adjusting the at least one light unit's 106 lighting strategy, including a detection threshold of the sensor 110, using the status information and/or determination of the expected flux.

6. The method of claim 5, wherein the step of adjusting includes increasing or decreasing the detection threshold of the sensor 110.

* * * * *